May 29, 1962 W. A. RICHARDSON 3,036,606
FORGED SAW CHAIN TOOTH AND A CHAIN EMPLOYING SUCH A TOOTH
Filed March 7, 1960
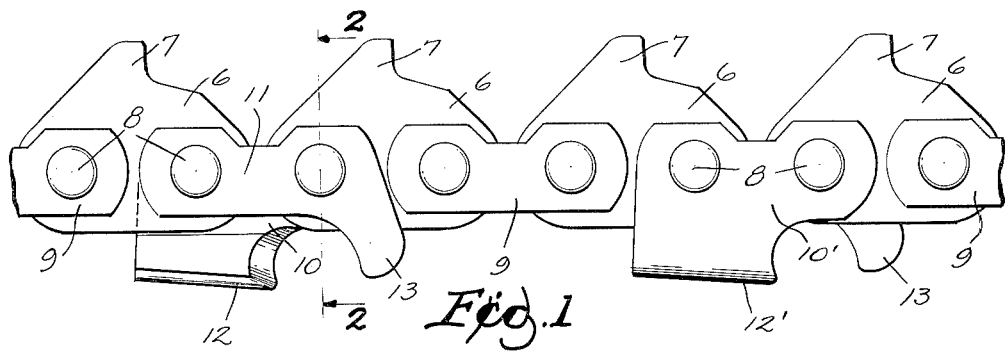
Fig. 1
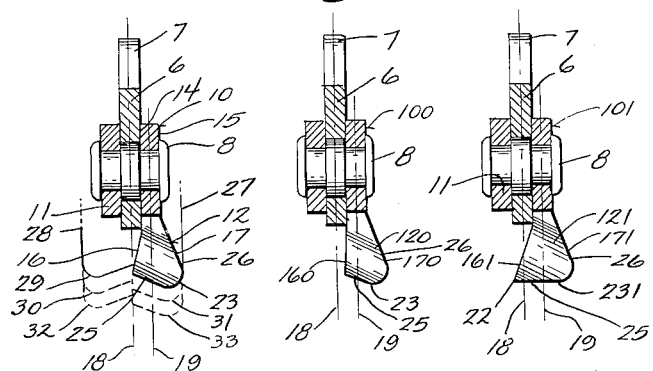
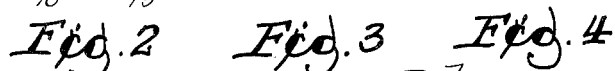 
Fig. 2  Fig. 3  Fig. 4
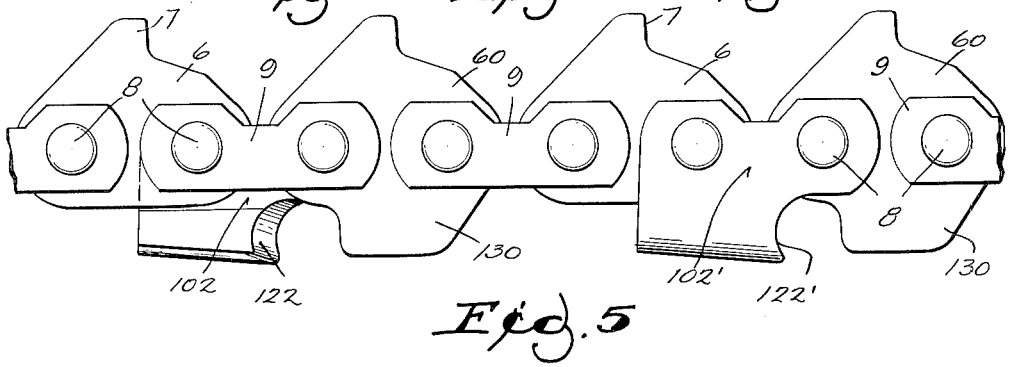
Fig. 5
INVENTOR.
WILLIAM A. RICHARDSON
BY
Wheeler, Wheeler + Wheeler
ATTORNEYS

United States Patent Office 3,036,606
Patented May 29, 1962

3,036,606
FORGED SAW CHAIN TOOTH AND A CHAIN EMPLOYING SUCH A TOOTH
William A. Richardson, North Burnaby, Vancouver, British Columbia, Canada, assignor to Outboard Marine Corporation, Waukegan, Ill., a corporation of Delaware
Filed Mar. 7, 1960, Ser. No. 13,334
6 Claims. (Cl. 143—135)

This invention relates to a forged saw chain tooth and a chain employing such a tooth.

Saw chain is usually made to include either scratcher teeth or router teeth. The present chain uses router teeth which are allochiral, alternately being right and left-hand teeth. In the preferred practice of the invention, they are made to constitute side links of the chain. The presently described embodiment is one in which center links and pairs of side links alternate in the chain, being connected by rivets. The center links are all drive links in this embodiment. Pairs of side links in which alternate side links carry router teeth are alternated with pairs of side links which carry no router teeth. Depth gauges may be mounted upon any of said links, the preferred arrangement disclosed being one in which each pair of side links which has a router tooth mounted on one of them has a depth gauge mounted on the other. However, the alternate arrangement disclosed is one in which the depth gauges are mounted on the center links which also serve as drive links.

The major feature of the invention consists in the use of solid forged router teeth integral with the links upon which they are mounted and triangular in cross section having no shank portion which is distinct and separate from the cutting portion of the tooth. In the case of each router tooth link, there are preferably flat faces for engagement by the rivet head and by the companion link but from that point to the cutting edges, the thickness of the metal increases progressively in both directions from a central plane to which the rivet is normal.

The tooth is triangular in cross section. The angles of the opposite faces of the tooth may be equal so that the tooth projects approximately to the same extent at both sides of the central plane or the angles may be unequal so that there is greater projection at one side of the central plane than at the other. The cutting edge of each tooth may extend across the common central plane of its center link to intersect the path of the next and opposite tooth, or the cutting edges of respective teeth may terminate short of the central plane of the center link, these various embodiments being disclosed herein.

In the drawings:

FIG. 1 is a fragmentary side elevational view of a chain embodying the invention.

FIG. 2 is a view in section on the line 2—2 of FIG. 1.

FIG. 3 is a view similar to FIG. 2 showing a modified cross sectional form of the router tooth.

FIG. 4 is a view similar to FIGS. 2 and 3 showing a further modified cross sectional form of the router tooth.

FIG. 5 is a view similar to FIG. 1 showing a different disposition of the depth gauge.

The chain of FIG. 1 comprises center links 6 which are provided with the usual drive teeth 7 and are connected with each other by side links of various types and rivets 8.

The side links are used in pairs. The side links 9 are identical at both sides of the chain and carry no cutting teeth or depth gauge means. Alternating with pairs of side links 9 are pairs of side links comprising links 10 and 11. The side links 10 and 10' are allochiral, respectively being provided with right and left hand teeth 12 and 12', the tooth 12 being on a lefthand side link 10 and the tooth 12' being on a righthand side link 10' as shown in FIGS. 1 and 2. In each case, the opposing side link 11 may carry a depth gauge 13, although the depth gauge may be mounted on the center or drive link 6 as shown at 130 on the drive link 60 in FIG. 5.

Instead of the usual shank portions which extend outwardly from the link to clear the rivet 8, the tooth 12 or 12' lacks the shank portions and progressively increases in transverse sectional thickness immediately upon clearing the center link. Thus the link 10 shown in FIG. 2 has a flat face at 14 for bearing contact with the center link 6 and it has an outer flat face at 15 abutted by the head of the rivet 8. Immediately below the margin of drive link 6, the tooth 12 has divergent surfaces 16 and 17 whereby the tooth is of generally triangular form in cross section. The outer flaring surface 17 of the tooth extends to a point beyond the end of rivet 8 while the inner flaring surface 16 of the tooth extends to a point near the vertical center line of link 6, such center line being indicated at 18.

The center line of the link 10 is also indicated, this being shown at 19. In the embodiment illustrated in FIG. 2, the outward projection of the surface 17 of the tooth slightly exceeds the inward projection of the surface 16 thereof so that the tooth is not symmetrical with reference to the central plane 19 of the link upon which it is mounted.

In the construction shown in FIG. 3, the link 100 is identical with the link 10 except for the fact that the tooth 120 is still more asymmetrical than that of FIG. 2 with respect to the central plane 19 of the link, its outer side surface 170 being similar to that shown at 17 in FIG. 2 but the inner side surface 160 being nearly vertical so that the entire tooth lies well outside of the central plane 19 of the center link 6.

The construction shown in FIG. 4 of the link 101 is a tooth 121 in which the outer surface 171 is again similar to that shown at 17, FIG. 2, and at 170 in FIG. 3, but the inner surface 161 has greater angularity so that the inner margin or apex 22 of the triangularly sectioned tooth extends well across the center line 18 of the center link 6.

Each of the teeth shown at 17 and 170 has its lower surface and its cutting margin 23 curved to project in an inward and upward direction, whereas, in tooth 121 of FIG. 4, the lower margin or cutting edge 231 is horizontal and rectilinear in a direction transverse with respect to the axis of the chain.

It will be understood that the triangular sections above described and the optionally rounded or flat lower faces and cutting edges are separate features usable in any combination. In all cases the teeth will be relieved both vertically and laterally, each tooth having less downward extent at its rear end than its forward end and less lateral extent at the rear end than at its forward end which clearly appears in FIG. 1. Each tooth may be sharpened by filing or grinding to provide lower marginal cutting edges 25 and lateral cutting edges 26. It is not necessary that the latter have any great vertical extent, it being sufficient that they carry to the maximum point of projection of the tooth as shown in FIGS. 2, 3 and 4.

The kerf made in the work by the operation of the chain is represented diagrammatically in FIG. 2, the side walls of the kerf being shown at 27 and 28. The last cut made by a righthand cutter tooth in the bottom of the kerf is shown at 29. The tooth 12 is illustrated in the process of making the next successive cut. The broken line at 30 marks the point at which the next righthand tooth will operate and the broken lines at 31, 32, 33 represent successive levels at which alternating left and right curved teeth will operate in the further functioning of the chain.

FIG. 5 is only to show that the depth gauge 13 need not be mounted on side link 11 but may be mounted on the center link 60 as shown at 130. In this case, one of the links 9 is used opposite the link 102 or 102' which carries a given router tooth 122 or 122'.

I claim:

1. A saw chain link integrally comprising a link portion with inner and outer faces at opposite sides of a central plane and a tooth portion having inner and outer faces constituting mutually divergent extensions of the faces of the link portion and disposed at opposite sides of said plane, the tooth portion being of an asymmetrical form of generally triangular cross section and progressively increasing in thickness downwardly from the link portion and having an end surface at a point of maximum projection from the link portion and provided with a sharpened edge in a direction transverse respecting the link, said tooth portion having a rounded outer corner merging with its said outer face and having a sharply angular inner corner where its inner face terminates at its said end surface.

2. The link of claim 1 in which said tooth portion faces extend approximately equidistantly and respectively inwardly and outwardly from the central plane of said link portion.

3. In saw chain comprising center links and side links in pivoted connection, the side links being in pairs, the improvement which comprises a side link having substantially parallel inner and outer faces, the inner of said faces engaging a center link, and a tooth integral with said side link and including inner and outer faces mutually divergent directly from the faces first mentioned, the tooth having a generally triangular form in cross section and progressively increasing in width to the lower extremity of the tooth, said tooth having a forward end portion provided with a surface meeting the lower extremity of the tooth at an acute angle to constitute a cutting edge, said tooth having a sharply angled corner at one end of said surface and a rounded corner at the other end of said surface and adjoining said outer tooth face.

4. The chain of claim 3 in which said chain comprises allochiral side links alternating in the chain, the cutting edges of said side links terminating substantially at the central plane of the center links of the chain.

5. The chain of claim 3 in which the chain includes allochiral side links alternating in the chain, the cutting edges of the respective side links extending across the central plane of the center links of the chain, the inner face and outer face of each tooth being divergent from a plane central between the parallel faces of their respective side links, the cutting edge of each tooth extending transversely across said plane at an acute angle to its inner face.

6. The chain of claim 3 in which the chain includes allochiral side links alternating in the chain and respectively terminating materially short of the central plane of the center links of the chain.

References Cited in the file of this patent

UNITED STATES PATENTS

| | | |
|---|---|---|
| 2,515,550 | Ciba | July 18, 1950 |
| 2,651,336 | Warren | Sept. 8, 1953 |
| 2,652,076 | Bye | Sept. 15, 1953 |
| 2,744,548 | Stephenson et al. | May 8, 1956 |
| 2,774,396 | Gommel | Dec. 18, 1956 |
| 2,854,041 | Siverson | Sept. 30, 1958 |
| 2,902,068 | Gudmundsen | Sept. 1, 1959 |

FOREIGN PATENTS

| | | |
|---|---|---|
| 870,181 | Germany | Mar. 12, 1953 |